(12) United States Patent
Moore et al.

(10) Patent No.: US 11,124,367 B2
(45) Date of Patent: Sep. 21, 2021

(54) AUTOMATED TRACKING SYSTEM FOR BAKING PANS AND TRAYS

(71) Applicant: AMERICAN PAN COMPANY, Urbana, OH (US)

(72) Inventors: Brad Moore, Galena, OH (US); Gregory D. Smith, Bellefontaine, OH (US)

(*) Notice: Subject to any disclaimer, the term of this patent is extended or adjusted under 35 U.S.C. 154(b) by 224 days.

(21) Appl. No.: 16/534,345

(22) Filed: Aug. 7, 2019

(65) Prior Publication Data
US 2020/0048009 A1 Feb. 13, 2020

Related U.S. Application Data

(60) Provisional application No. 62/716,120, filed on Aug. 8, 2018.

(51) Int. Cl.
| | |
|---|---|
| *G06F 7/00* | (2006.01) |
| *B65G 43/08* | (2006.01) |
| *A21B 3/13* | (2006.01) |
| *G06Q 50/28* | (2012.01) |
| *G06Q 10/08* | (2012.01) |

(52) U.S. Cl.
CPC .............. *B65G 43/08* (2013.01); *A21B 3/135* (2013.01); *G06Q 10/08* (2013.01); *G06Q 50/28* (2013.01); *B65G 2201/0258* (2013.01); *B65G 2203/0216* (2013.01); *B65G 2203/042* (2013.01)

(58) Field of Classification Search
CPC .. G06Q 50/28; G06Q 10/08; B65G 2203/042; B65G 2201/0258; B65G 2203/0216; B65G 43/08; A21B 3/135; A21B 3/13; A21B 3/15

USPC ................. 700/213–214, 223–226, 228–230
See application file for complete search history.

(56) References Cited

U.S. PATENT DOCUMENTS

| | | | |
|---|---|---|---|
| 2004/0074401 A1 | 4/2004 | McMaster et al. | |
| 2007/0254080 A1* | 11/2007 | Schackmuth | G06Q 50/12 426/523 |

(Continued)

OTHER PUBLICATIONS

International Search Report and Written Opinion dated Oct. 29, 2019 for International Application No. PCT/US2019/045725, 9 pages.

*Primary Examiner* — Yolanda R Cumbess

(57) ABSTRACT

A system for tracking and managing baking pans and trays, comprising a set of baking pans or trays that includes a plurality of individual baking pans or trays, each of which includes a unique identification tag positioned thereon, wherein each unique identification tag includes information about the individual baking pan or tray on which the identification tag is positioned; and a data acquisition system that includes at least one sensor mounted in proximity to a production line conveyor for detecting baking pans or trays positioned on the conveyor; at least one tag-reading device that is activated when the at least one sensor detects a pan or tray on the conveyor, wherein the at least one tag reading device reads information from each identification tag and transmits the information to a controller; and a controller that includes hardware and software that controls the at least one sensor and the at least one tag reading device, and that receives, processes, and outputs the information read from the identification tags on the baking pans or trays.

14 Claims, 2 Drawing Sheets

(56) References Cited

U.S. PATENT DOCUMENTS

Figure 1:
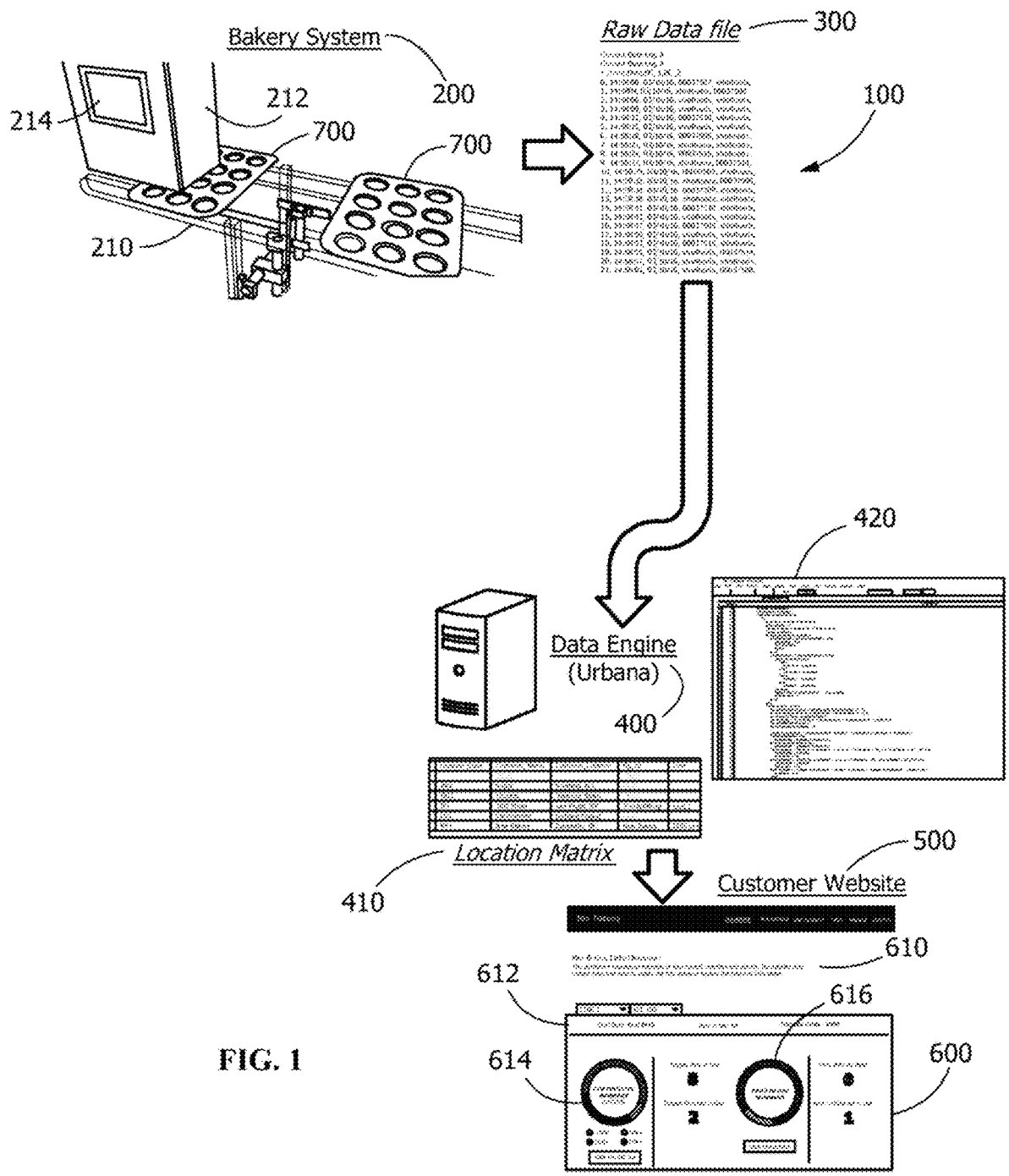

| | | | |
|---|---|---|---|
| 2008/0311263 A1* | 12/2008 | Willett | A21B 7/00 |
| | | | 426/505 |
| 2009/0014279 A1* | 1/2009 | Bouetard | B65G 15/00 |
| | | | 198/358 |
| 2015/0290795 A1* | 10/2015 | Oleynik | G05B 19/42 |
| | | | 700/257 |
| 2016/0235239 A1 | 8/2016 | Patadia | |

* cited by examiner

AUTOMATED TRACKING SYSTEM FOR BAKING PANS AND TRAYS

CROSS-REFERENCE TO RELATED APPLICATIONS

This patent application claims the benefit of U.S. Provisional Patent Application Ser. No. 62/716,120 filed on Aug. 8, 2018 and entitled "Automated Tracking System for Baking Pans and Trays," the disclosure of which is hereby incorporated by reference herein in its entirety and made part of the present U.S. utility patent application for all purposes.

BACKGROUND

The described invention relates in general to systems, devices, and methods for tracking items used in industrial and commercial processes, and more specifically to an automated system for tracking the use of industrial baking pans and trays throughout the life-cycles of such items.

Baking pans and trays are commonly used by producers of various baked goods that are supplied to restaurants and grocery stores. Because producers of baked goods often supply large quantities of baked goods to their customers, the pans and trays such goods are baked on are reused many times and are repeatedly subjected to both high thermal and mechanical stresses. Repeated exposure to high temperatures and mechanical stress requires that an industrial baking pan or tray be manufactured from a durable material such as steel or aluminum. Although manufacturing a baking tray from materials such as steel or aluminum does increase the lifespan of the tray, repeated use, re-glazing, or other physical or chemical stressors eventually weakens the metal of the tray and cracks or fractures may appear in the metal surface of the tray. Once a tray has sustained such damage, it is no longer useable and must be discarded. Due to the significant expense of replacing industrial baking pans and trays and the desire to not use pans or trays that are no longer functioning optimally, users of such items may wish to carefully track pan and tray usage for quality control purposes and for accurately budgeting and timing tray or pan replacement. Thus, there is an ongoing need for a tracking system that provides bakeries and other facilities with valuable, accurate, and precise data for monitoring baking pan life and production line efficiency based on pan and tray usage and condition.

SUMMARY

The following provides a summary of certain exemplary embodiments of the present invention. This summary is not an extensive overview and is not intended to identify key or critical aspects or elements of the present invention or to delineate its scope. However, it is to be understood that the use of indefinite articles in the language used to describe and claim the present invention is not intended in any way to limit the described system. Rather the use of "a" or "an" should be interpreted to mean "at least one" or "one or more".

Disclosed systems and methods provide a "smart" baking pan or baking tray tracking system that improves pan management by tracking the number of bakes per pan, monitoring pan coating life to better anticipate service needs, and identifying missing pans or inappropriately mixed sets of pans. These systems and methods also improve product line efficiency by monitoring the number and duration of gaps between baking pans, determining the total gap time between baking pans, and comparing theoretical yields to actual yields to accurately characterize production line efficiency.

In one implementation, a first system for tracking and managing baking pans and trays is provided. This system comprises a set of baking pans or trays, wherein the set of baking pans or trays includes a plurality of individual baking pans or trays, wherein each individual baking pan or tray includes a unique identification tag positioned thereon, and wherein each unique identification tag includes information about the individual baking pan or tray on which the identification tag is positioned; and a data acquisition system, wherein the data acquisition system includes at least one sensor mounted in proximity to a production line conveyor for detecting baking pans or trays positioned on the conveyor; at least one tag-reading device, wherein the at least one tag reading device is activated when the at least one sensor detects a pan or tray on the conveyor, and wherein the at least one tag reading device reads information from each identification tag and transmits the information to a controller; and a controller, wherein the controller includes hardware and software that controls the at least one sensor and the at least one tag reading device, and that receives, processes, and outputs the information read from the identification tags on the baking pans or trays.

In another implementation, a second system for tracking and managing baking pans and trays is provided. This system comprises a set of baking pans or trays, wherein the set of baking pans or trays includes a plurality of individual baking pans or trays, wherein each individual baking pan or tray includes a unique identification tag positioned thereon, and wherein each unique identification tag includes information about the individual baking pan or tray on which the identification tag is positioned; and a data acquisition system, wherein the data acquisition system includes at least one sensor mounted in proximity to a production line conveyor for detecting baking pans or trays positioned on the conveyor; at least one tag-reading device, wherein the at least one tag reading device is activated when the at least one sensor detects a pan or tray on the conveyor, and wherein the at least one tag reading device reads information from each identification tag and transmits the information to a controller; and a controller, wherein the controller includes hardware and software that controls the at least one sensor and the at least one tag reading device, and that receives, processes, and outputs the information read from the identification tags on the baking pans or trays; a server in communication with the data acquisition system, wherein the server includes hardware and software that receives, processes, and outputs the information received from the controller; and an end-user terminal, wherein the end-user terminal includes an interactive user interface that displays reports about the baking pans and trays.

In still another implementation, a third system for tracking and managing baking pans and trays is provided. This system comprises a baking environment, wherein the baking environment includes a conveyor adapted to move baking pans or trays through a baking product production line; a set of baking pans or trays, wherein the set of baking pans or trays includes a plurality of individual baking pans or trays, wherein each individual baking pan or tray includes a unique identification tag positioned thereon, and wherein each unique identification tag includes information about the individual baking pan or tray on which the identification tag is positioned; a data acquisition system, wherein the data acquisition system includes at least one sensor mounted in proximity to the conveyor for detecting baking pans or trays on the conveyor; at least one tag-reading device, wherein the at least one tag reading device is activated when the at least one sensor detects a pan or tray on the conveyor, and wherein the at least one tag reading device reads information from the identification tag and transmits the information to a controller; and a controller, wherein the controller includes hardware and software that controls the at least one pair of sensors and the at least one tag reading device, and that receives, processes, and outputs the information from the identification tags on the baking pans or trays; and a server in communication with the data acquisition system, wherein the server includes hardware and software that receives, processes, and outputs the information received from the controller; and an end-user terminal, wherein the end-user terminal includes an interactive user interface that displays reports about the baking pans and trays.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION

Figure 2:
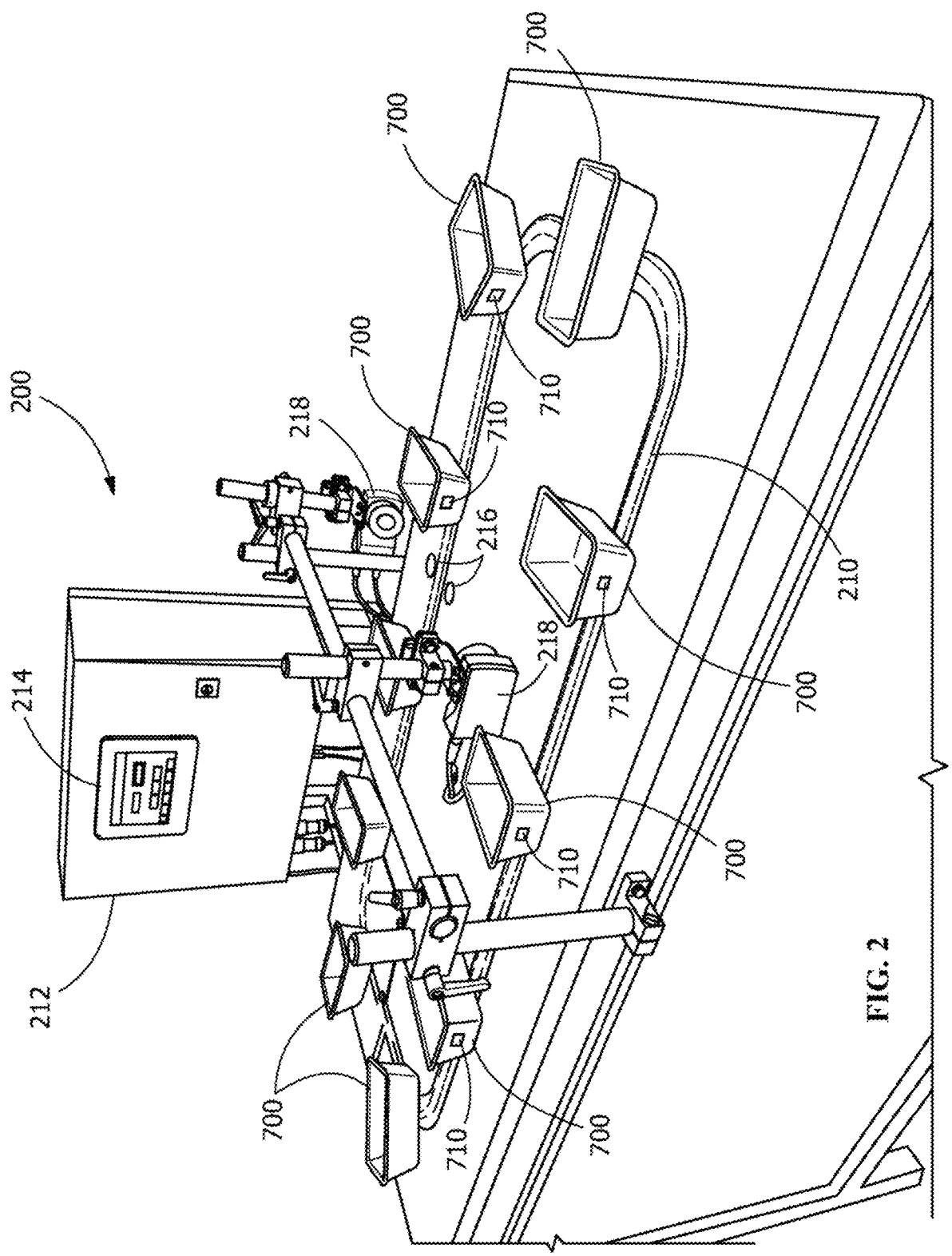

The accompanying drawings, which are incorporated into and form a part of the specification, schematically illustrate one or more exemplary embodiments of the invention and, together with the general description given above and detailed description given below, serve to explain the principles of the invention, and wherein:

FIG. 1 is schematic view of an implementation illustrating an exemplary flow of information through a pan tracking system; and FIG. 2 is a perspective view of an implementation showing an exemplary configuration of a pan tracking system and the relative placements of the various components of the pan tracking system.

DETAILED DESCRIPTION

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

Certain implementations are referred to as the "American Pan SMART Pan Tracking® system" and include a sophisticated, automated tracking system, apparatus, and method that provide commercial bakeries and other facilities with valuable, accurate, and precise data for monitoring baking pan and baking tray coating life, production line efficiency, and anticipating servicing needs. Data gathered and processed may be used for continuous quality control and quality assurance purposes. Implementations provide numerous advantageous features including: (i) convenient and secure access to vital operational data at any time and from any location; (ii) an intuitive graphical user interface (e.g., dashboard) that permits visualizing data with charts, graphs, and analytics; and (iii) compatibility with existing production line equipment. The disclosed system, apparatus, and method may be used in virtually any operation and for any pan or tray type and may be installed on existing bakery conveyors in existing bakery environments.

With reference to FIGS. 1-2, in the broadest sense, an exemplary smart pan tracking system 100 includes bakery system/environment 200; raw data file output 300; data engine 400, which typically resides in a physical location separate from bakery environment 200; and customer website 500, which includes dashboard 600. Bakery environment 200 includes system conveyor 210, controller 212 (which in some implementations further includes display screen 214), sensor 216 (which may be a single sensor, a pair of sensors, or multiple sensors), and image-based code (tag) readers 218, which collect time-stamped data from pans 700, each of which includes at least one pan ID tag 710. Within bakery environment 200, pans 700 travel across or along conveyor 210, pan sensor 216 detects the presence of each pan 700 and triggers tag readers 218, which gather information and data from each pan ID tag 710. Controller 212 is used to configure the general operation of pan sensor 216 and tag readers 218. Raw data file output 300 includes information and data specific to each pan 700, and that information and data is communicated electronically to data engine 400. Data engine 400 is essentially a remote secure server and data processor that creates location matrix 410 and that runs at least one data processing application 420. Location matrix 410 and data processing application 420 process raw data file output 300 for generating dashboard 600, which may be viewed on a password-protected customer website 500. Dashboard 600 provides an overview of current pan inventory and production activity in a particular bakery. Pan tracking system 100 may be used to gather information and data from numerous bakery environments simultaneously. An exemplary implementation of system 100 logs about 45,000 reads per day. Although not shown in the Figures, dust blow-off nozzles may be included for use in high-dust/food particle environments to facilitate proper functioning of sensors 216 and tag readers 218.

As previously stated, each pan 700 includes at least one ID tag 710 that has been positioned on the pan in a permanent manner, typically at the time the pan is manufactured. In various implementations, ID tag 710 includes a pan number (i.e., numeric identifier) and a unique multi-pass two-dimensional matrix code that can store, in a retrievable manner, multiple fields of data relevant to the characteristics and history of each baking pan or tray. In certain implementations, Pan ID tags 710 are data matrix barcodes that include the following data matrix code specifications: (i) data: eight alpha numeric characters; (ii) code format: (ISO/IEC 16022); (iii) matrix size 12×12 (cell structure); (iv) physical size: 11 mm×11 mm or 15 mm×15 mm (overall); 1.25 mm (element). Data matrix barcode (ISO/IEC 16022) is a high-density, two-dimensional (2D) symbology that encodes text, numbers, files and actual data bytes. In some implementations, Pan ID tags 710 are laser-etched, in a clean and distinct manner, on the bottom or side of baking pans or trays and are capable of withstanding cleaning and recoating processes.

A non-limiting example of a suitable commercially available product for pan sensors 216 is SICK WSE9L-3P2437: Through-Beam Photoelectric Sensor; Emitter and Receiver Pair; PNP; 10-30 VDC; M12 QD available from Allied Electronics & Automation (see: https://www.alliedelec.com/ product/sick/wse91-3p2437/70883748/). A non-limiting example of a suitable commercially available product for tag readers 218 is the Lector 63x Flex S-mount Image-Based Code Reader (see: https://www.sick.com/us/en/identification-solutions/image-based-code-readers/lector63x/c/g326251). The location of tag readers 218 within bakery environment 200 will generally determine the location of pan sensor 216. In various implementations, sensor 216 is mounted on an adjustable support to which tag readers 218 are also mounted. However, as shown in FIG. 2, sensor 216 may be mounted in or underneath a surface on which conveyor 210 is mounted. Other hardware and mounting configurations are possible in various other implementations.

For each type of baking tray or pan manufactured, basic information about each pan is entered into at least one database, which is a component or aspect of the disclosed system. This basic information corresponds to the information stored on each ID tag 710. This database may reside on a server that is an aspect of data engine 400 or that is in communication with data engine 400. Basic pan or tray information may include mold size, life expectancy of the coating used on each pan or tray, and other data relevant to the physical and historical characteristics of the pan such as original date of manufacturing, date of initial coating, dates of recoating, etc. When system 100 is in use, pan or tray data logs are transmitted by a secure FTP site to the same database or to another database for generating pan reports and for permanent data retention. Data for each bakery environment 200 automatically uploads to secure website 500 for generating and reviewing reports, running analytics, and downloading metrics and raw data as desired.

With reference to FIG. 1, dashboard 600 includes various reports specific to the pans or trays being used in a particular baking environment 200. For example, dashboard 600 may include pan and line overview 610, Which provides an overview of current pan inventory and activity. For pans, pan and line overview 610 permits a system user to view pan set specific data 612, which includes the date a set of pans was placed on the production line, the total number of pans in the original set used for a particular production line, and a projected total number of baking cycles for each pan. Pan and line overview 610 also includes coating life summary 614, which provides a succinct summary of the number of baking cycles that each pan has experienced and therefore, the coating life remaining for each pan. Pan and line overview 610 also includes pans in use summary 616, which provides a summary of the number of tagged pans currently online (i.e., tagged pans in use), whether or not pans are missing from a particular set (i.e., tagged pans not online), whether or not pans sets have been mixed with one another (i.e., pans outside set in use), and Whether or not there are pans that are not tagged (i.e., pans with no read) within a set.

Various links included on dashboard 600 provide pan detail reports with in-depth information about particular pans and pan sets or groups. This information may include bakery name and location; initial pan in-use date; production line number; pan type (e.g., hamburger bun); total number of molds in a pan; mold dimensions; pan dimensions; tag range; total number of pans in a set; projected baking cycles, and the number of pans currently over or under projected baking cycles. Color-coded indicators may be used to provide easy identification of pans that are close to or that have exceeded the recommended number of use cycles. A user may view preset report filters, sort data, or download raw data, as desired.

With regard to a production line, pan and line overview 610 provides theoretical product yields (e.g. total dozens produced), as well as the average number of baking cycles per pan within a predetermined time period (e.g., 24 hours), the average number of baking cycles per week, and the coating life remaining for each pan. The number and total time of pan gaps is provided for specified time ranges as is total gap time for a 24-hour period. Also provided are pan cycle details such as the total number of pan cycles for specified ranges for monitoring production changes. Theoretical yield represents the amount of product that would be produced if every pan was used to full capacity and is based on the total number of molds or pans multiplied by the total number of baking cycles. Theoretical yield may be viewed for periods of days or weeks using relevant or predetermined units of measurement. Comparing theoretical yields to actual yields may reveal scrap, lost product, or productivity shortfalls. Line efficiency may be based on pan gaps or the time between two pan readings and may be summarized to provide insight into overall line efficiency.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A system for tracking and managing baking pans and trays, comprising:
   (a) a set of baking pans or trays, wherein the set of baking pans or trays includes a plurality of individual baking pans or trays, wherein each individual baking pan or tray includes a unique identification tag positioned thereon, and wherein each unique identification tag includes information about the individual baking pan or tray on which the identification tag is positioned; and
   (b) a data acquisition system, wherein the data acquisition system includes:
      (i) at least one sensor mounted in proximity to a production line conveyor for detecting baking pans or trays positioned on the conveyor;
      (ii) at least one tag-reading device, wherein the at least one tag reading device is activated when the at least one sensor detects a pan or tray on the conveyor, and wherein the at least one tag reading device reads information from each identification tag and transmits the information to a controller; and
      (iii) a controller, wherein the controller includes hardware and software that controls the at least one sensor and the at least one tag reading device, and that receives, processes, and outputs the information read from the identification tags on the baking pans or trays;
   (c) a server in communication with the data acquisition system, wherein the server includes hardware and software that receives, processes, and outputs the information received from the controller; and
   (d) a database that contains information about each pan or tray in the set, wherein the information about each pan or tray contained in the database corresponds to the unique identification tag positioned on that pan or tray, wherein the database resides on or is in communication with the server, and wherein the information about each pan or tray contained in the database includes bakery name and location; initial pan or tray in-use date; production line number; pan or tray type; total number of molds in a pan; mold dimensions; pan or tray dimensions; tag range; total number of pans in a set; projected baking cycles; and number of pans currently over or under projected baking cycles.

2. The system of claim 1, wherein each baking pan or tray further includes a coating that provides non-stick and corrosion-resistance properties to the pan or tray.

3. The system of claim 1, further comprising an end-user terminal, wherein the end-user terminal includes an interactive user interface that displays reports about the baking pans and trays.

4. The system of claim 3, wherein the reports about the baking pans and trays include: the date a set of pans or trays was placed on a production line; the total number of pans or trays in an original set used for a particular production line; a projected total number of baking cycles for each pan or tray; the number of baking cycles that each pan or tray has experienced and the coating life remaining for each pan or tray; the number of tagged pans currently online; whether or not pans are missing from a particular set; whether or not pan sets have been mixed with one another; and whether or not there are pans that are not tagged within a set.

5. The system of claim 1, wherein the unique identification tag is a data matrix barcode that is laser-etched into one or more surfaces of the pan or tray.

6. A system for tracking and managing baking pans and trays used on productions lines in commercial environments:
   (a) a set of baking pans or trays, wherein the set of baking pans or trays includes a plurality of individual baking pans or trays, wherein each individual baking pan or tray includes a unique identification tag positioned thereon, and wherein each unique identification tag includes information about the individual baking pan or tray on which the identification tag is positioned; and
   (b) a data acquisition system, wherein the data acquisition system includes:
      (i) at least one sensor mounted in proximity to a production line conveyor for detecting baking pans or trays positioned on the conveyor;
      (ii) at least one tag-reading device, wherein the at least one tag reading device is activated when the at least one sensor detects a pan or tray on the conveyor, and wherein the at least one tag reading device reads information from each identification tag and transmits the information to a controller; and
      (iii) a controller, wherein the controller includes hardware and software that controls the at least one sensor and the at least one tag reading device, and that receives, processes, and outputs the information read from the identification tags on the baking pans or trays;
   (c) a server in communication with the data acquisition system, wherein the server includes hardware and software that receives, processes, and outputs the information received from the controller;
   (d) an end-user terminal, wherein the end-user terminal includes an interactive user interface that displays reports about the baking pans and trays; and
   (e) a database that contains information about each pan or tray in the set, wherein the information about each pan or tray contained in the database corresponds to the unique identification tag positioned on that pan or tray, and wherein the database resides on or is in communication with the server; wherein the information about each pan or tray contained in the database includes: bakery name and location; initial pan or tray in-use date; production line number; pan or tray type; total number of molds in a pan; mold dimensions; pan or tray dimensions; tag range; total number of pans in a set; projected baking cycles; and number of pans currently over or under projected baking cycles.

7. The system of claim 6, wherein each baking pan or tray further includes a coating that provides non-stick and corrosion-resistance properties to the pan or tray.

8. The system of claim 6, wherein the reports about the baking pans and trays include: the date a set of pans or trays was placed on a production line; the total number of pans or trays in an original set used for a particular production line; a projected total number of baking cycles for each pan or tray; the number of baking cycles that each pan or tray has experienced and the coating life remaining for each pan or tray; the number of tagged pans currently online; whether or not pans are missing from a particular set; whether or not pan sets have been mixed with one another; and whether or not there are pans that are not tagged within a set.

9. The system of claim 6, wherein the unique identification tag is a data matrix barcode that is laser-etched into one or more surfaces of the pan or tray.

10. A system for tracking and managing baking pans and trays, comprising:
   (a) a baking environment, wherein the baking environment includes a conveyor adapted to move baking pans or trays through a baking product production line;
   (b) a set of baking pans or trays, wherein the set of baking pans or trays includes a plurality of individual baking pans or trays, wherein each individual baking pan or tray includes a unique identification tag positioned thereon, and wherein each unique identification tag includes information about the individual baking pan or tray on which the identification tag is positioned;
   (c) a data acquisition system, wherein the data acquisition system includes:
      (i) at least one sensor mounted in proximity to the conveyor for detecting baking pans or trays on the conveyor;
      (ii) at least one tag-reading device, wherein the at least one tag reading device is activated when the at least one sensor detects a pan or tray on the conveyor, and wherein the at least one tag reading device reads information from the identification tag and transmits the information to a controller; and
      (iii) a controller, wherein the controller includes hardware and software that controls the at least one pair of sensors and the at least one tag reading device, and that receives, processes, and outputs the information from the identification tags on the baking pans or trays; and
   (d) a server in communication with the data acquisition system, wherein the server includes hardware and software that receives, processes, and outputs the information received from the controller; and
   (e) an end-user terminal, wherein the end-user terminal includes an interactive user interface that displays reports about the baking pans and trays, and wherein the reports about the baking pans and trays include the date a set of pans or trays was placed on a production line; the total number of pans or trays in an original set used for a particular production line; a projected total number of baking cycles for each pan or tray; the number of baking cycles that each pan or tray has experienced and the coating life remaining for each pan or tray; the number of tagged pans currently online; whether or not pans are missing from a particular set whether or not pan sets have been mixed with one another; and whether or not there are pans that are not tagged within a set.

11. The system of claim 10, wherein each baking pan or tray further includes a coating that provides non-stick and corrosion-resistance properties to the pan or tray.

12. The system of claim 10, further comprising a database that contains information about each pan or tray in the set, wherein the information about each pan or tray contained in the database corresponds to the unique identification tag positioned on that pan or tray, and wherein the database resides on or is in communication with the server.

13. The system of claim 12, wherein the information about each pan or tray contained in the database includes: bakery name and location; initial pan or tray in-use date; production line number; pan or tray type; total number of molds in a pan; mold dimensions; pan or tray dimensions; tag range; total number of pans in a set; projected baking cycles; and number of pans currently over or under projected baking cycles.

14. The system of claim 10, wherein the unique identification tag is a data matrix barcode that is laser-etched into one or more surfaces of the pan or tray.

\* \* \* \* \*